(12) United States Patent
Niiya

(10) Patent No.: US 11,480,449 B2
(45) Date of Patent: Oct. 25, 2022

(54) DETECTION DEVICE

(71) Applicant: DMG MORI Co., Ltd., Yamatokoriyama (JP)

(72) Inventor: Masayuki Niiya, Isehara (JP)

(73) Assignee: DMG MORI Co., Ltd., Nara (JP)

( * ) Notice: Subject to any disclaimer, the term of this patent is extended or adjusted under 35 U.S.C. 154(b) by 101 days.

(21) Appl. No.: 16/912,845

(22) Filed: Jun. 26, 2020

(65) Prior Publication Data

US 2020/0408571 A1   Dec. 31, 2020

(30) Foreign Application Priority Data

Jun. 27, 2019   (JP) .............................. JP2019-120275

(51) Int. Cl.
*G01D 5/347*   (2006.01)

(52) U.S. Cl.
CPC ..... *G01D 5/34707* (2013.01); *G01D 5/34776* (2013.01)

(58) Field of Classification Search
CPC .......... G01D 5/34707; G01D 5/34776; G01D 5/24485; G01D 5/38; G01D 5/34792; G01D 2205/90; G01D 5/2457; G01D 5/34746; G01D 5/12; G01D 5/24476; G01B 11/165; G01B 11/16; G01B 11/00; G01B 11/002; G01B 11/02; G01B 11/14
See application file for complete search history.

(56) References Cited

U.S. PATENT DOCUMENTS

| | | | | |
|---|---|---|---|---|
| 5,579,111 A | * | 11/1996 | Maeda | G01D 5/38 250/237 G |
| 6,882,477 B1 | * | 4/2005 | Schattenburg | G03F 7/70408 359/35 |
| 2003/0174344 A1 | * | 9/2003 | Jones | G01D 5/38 356/616 |
| 2007/0041024 A1 | * | 2/2007 | Gao | G01D 5/28 356/616 |
| 2011/0218760 A1 | * | 9/2011 | Takahama | G01D 5/34746 702/150 |
| 2012/0112050 A1 | * | 5/2012 | Joerger | G01B 11/2441 250/231.1 |
| 2013/0286483 A1 | * | 10/2013 | Fiorentino | G02B 5/1809 359/566 |
| 2014/0195193 A1 | * | 7/2014 | Tamiya | G01B 11/00 702/150 |

(Continued)

FOREIGN PATENT DOCUMENTS

| | | | | | |
|---|---|---|---|---|---|
| JP | H05133769 A | * | 5/1993 | ............... | G01D 5/26 |
| JP | 2004160510 A | * | 6/2004 | ............ | B23K 11/24 |

(Continued)

*Primary Examiner* — Mohamed K Amara
(74) *Attorney, Agent, or Firm* — The Webb Law Firm

(57) ABSTRACT

In order to provide a detection device that can accurately detect thermal deformation in any state including a case where thermal deformation has already occurred, there is provided a detection device which includes: a scale with a strained grating; and two sensor heads mounted on a pedestal at a predetermined distance, the sensor heads detecting positions on the scale based on the grating. Thermal deformation of the pedestal or the scale is detected based on a change in a difference between the positions detected by the two sensor heads.

8 Claims, 5 Drawing Sheets

(56) References Cited

U.S. PATENT DOCUMENTS

| | | | | |
|---|---|---|---|---|
| 2015/0323355 A1* | 11/2015 | Kramer | ................ | G02B 26/101 |
| | | | | 250/231.14 |
| 2018/0079197 A1* | 3/2018 | Lucas | ..................... | B41F 13/02 |
| 2018/0361766 A1* | 12/2018 | Shirato | ................ | B41J 11/0095 |
| 2019/0257987 A1* | 8/2019 | Saari | ................. | H01L 27/14645 |
| 2020/0243400 A1* | 7/2020 | Wang | ..................... | G06N 20/10 |

FOREIGN PATENT DOCUMENTS

| | | | | |
|---|---|---|---|---|
| JP | 3603808 B2 * | 12/2004 | ............. | B23K 11/24 |
| JP | 2006160512 A | 6/2006 | | |
| JP | 2015215241 A | 12/2015 | | |
| KR | 20080061398 A * | 7/2008 | ............. | B23K 26/00 |
| WO | WO-8706373 A1 * | 10/1987 | ......... | G05B 19/4141 |
| WO | WO-9723772 A1 * | 7/1997 | ............. | G01B 11/16 |
| WO | WO-2019010185 A1 * | 1/2019 | ........... | G01B 11/165 |

\* cited by examiner

DETECTION DEVICE

CROSS-REFERENCE TO RELATED APPLICATION

This application claims priority to Japanese Patent Application No. 2019-120275 filed Jun. 27, 2019, the disclosure of which is hereby incorporated by reference in its entirety.

BACKGROUND

Technical Field

The present invention relates to a detection device that detects a position using a scale.

Related Art

A detection device that detects a position using a scale is used in various technical fields. Among them, an incremental position detection device that detects marks provided on a scale by two sensors, and calculates and corrects a pitch error of the marks due to thermal expansion etc. from a phase difference of mark detection signals detected by the two sensors has been proposed (for example, refer to JP 2006-160512 A).

SUMMARY

However, in the detection device described in JP 2006-160512 A, when a pitch error of marks has occurred in advance due to thermal deformation etc. and the error exceeds half a wavelength (180-degree phase), a problem that the pitch error of the marks cannot be normally detected arises.

The present invention has been made in view of the above problem, and an object of the present invention is to provide a detection device that can accurately detect thermal deformation in any state including a case where thermal deformation has already occurred.

In order to solve the above problem, a detection device according to one aspect of the present invention, including: a scale with a strained grating; and two sensor heads mounted on a pedestal at a predetermined distance, the sensor heads detecting positions on the scale based on the grating, in which thermal deformation of the pedestal or the scale is detected based on a change in a difference between the positions detected by the two sensor heads.

According to the above-described aspect, it is possible to provide a detection device that can accurately detect thermal deformation in any state including a case where thermal deformation has already occurred.

DETAILED DESCRIPTION

Figure 1:
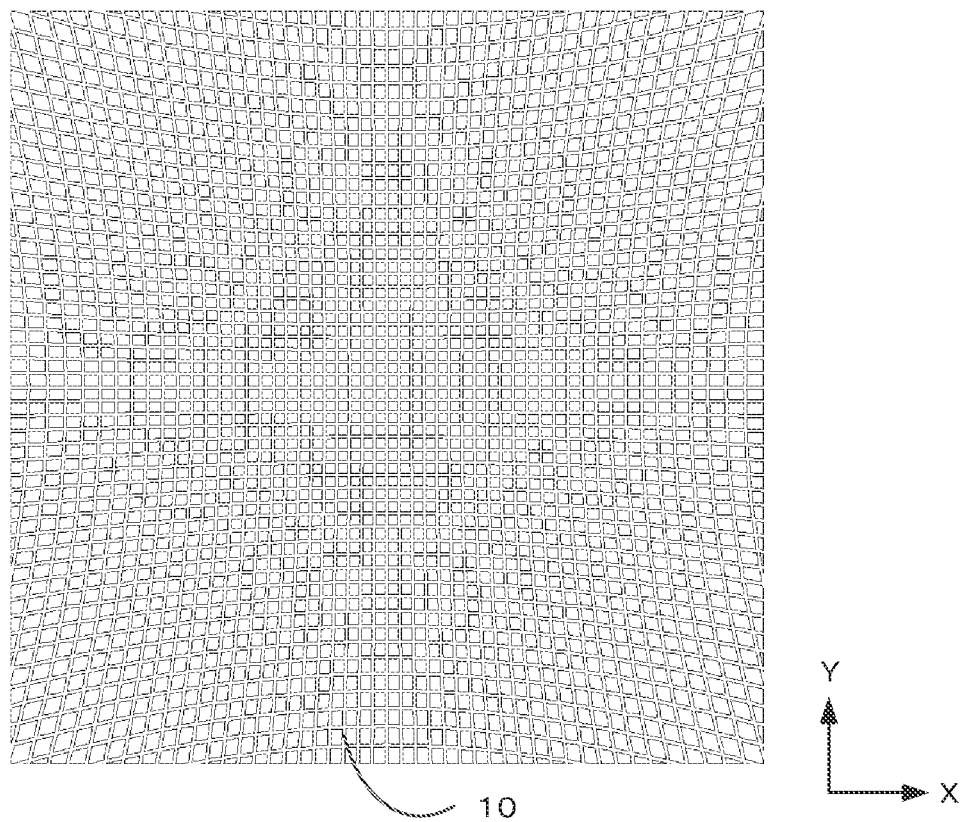
FIG. 1 is a plan view schematically showing an example of a scale provided with a strained grating.

An embodiment for carrying out the present invention will be described below with reference to the drawings. The embodiment described below is for embodying a technical idea of the present invention, and the present invention is not limited to the following unless otherwise specified. The sizes and positional relationships of members shown in the drawings may be exaggerated in some cases in order to clarify the explanation.

(Detection Device and Detection System According to One Embodiment of the Present Invention)

Figure 2:
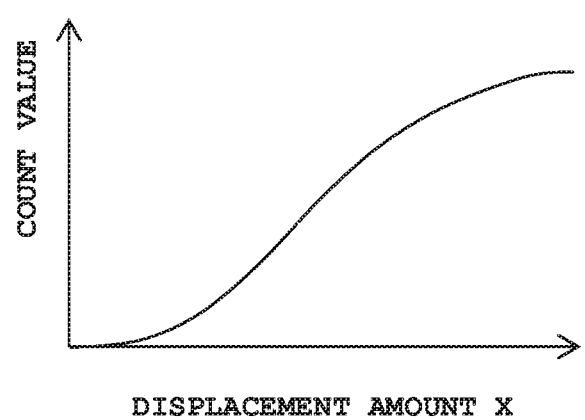
FIG. 2 is a graph showing a correlation between a displacement amount in an X-axis direction of the scale shown in FIG. 1 and a count value by the grating.
Figure 3:
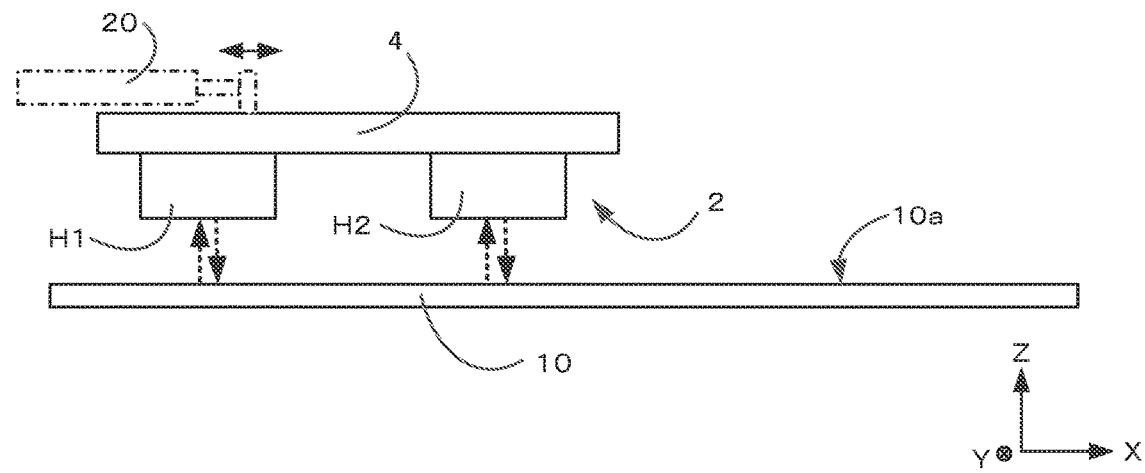
FIG. 3 is a side view schematically showing a detection device according to one embodiment of the present invention.
Figure 4:
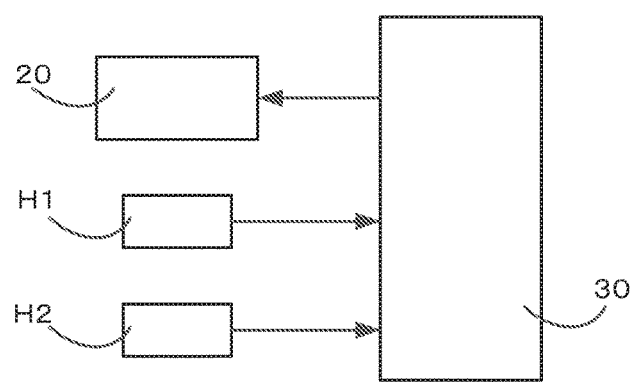
FIG. 4 is a block diagram showing a detection system according to the one embodiment of the present invention.

First, a detection device and a detection system according to one embodiment of the present invention will be described with reference to FIGS. 1 to 4. FIG. 1 is a plan view schematically showing an example of a scale provided with a strained grating. FIG. 2 is a graph showing a correlation between a displacement amount in an X-axis direction of the scale shown in FIG. 1 and a count value by the grating. FIG. 3 is a side view schematically showing the detection device according to the one embodiment of the present invention. FIG. 4 is a block diagram showing the detection system according to the one embodiment of the present invention.

A detection device 2 according to the present embodiment includes a scale 10 and two sensor heads H1 and H2 attached to a pedestal 4 at a predetermined distance. The scale 10 has a substantially flat plate shape. Light emitting/light receiving surfaces of the sensor heads H1 and H2 are arranged to face a detection surface 10a, which is an upper surface of the scale 10. The pedestal 4 to which the sensor heads H1 and H2 are attached is moved by a moving mechanism 20 along the detection surface 10a of the scale 10. An example of the distance between the two sensor heads H1 and H2 is 20 mm to 100 mm.

The schematically shown moving mechanism 20 can grasp a displacement amount of the pedestal 4 with respect to the scale 10, that is, a displacement amount of the sensor heads H1 and H2 with respect to the scale 10. The detection device 2 itself may be provided with the moving mechanism 20, or the scale 10 and the pedestal 4 may be relatively moved by a moving mechanism of equipment in which the detection device 2 is installed. FIG. 3 shows that the pedestal 4 side moves. However, the present invention is not limited thereto, and the scale 10 side may move.

<Sensor Heads>

The sensor heads H1 and H2 according to the present embodiment each include a light source unit that irradiates the scale 10 with light and a light receiving unit that receives reflected light (diffracted light) from the scale 10. An LD or an LED can be used as a light source, and the light source unit has an optical system such as a collimator lens and a condenser lens. The light receiving unit includes a light receiving element such as a CCD or a CMOS, and if necessary, an optical system such as a mirror or a beam splitter. With such a configuration, the sensor heads H1 and H2 can output signals based on diffracted light from a diffraction grating provided on the scale 10.

<Scale>

A plurality of slits is formed on the detection surface 10a of the scale 10 to form the diffraction grating. Although the scale 10 has a reflection type diffraction grating, it may be a transmission type.

The plurality of slits is formed on the detection surface 10a of the scale 10 along an X-axis direction at predetermined intervals, and the diffraction grating is formed by the slits. In the present embodiment, a pitch interval of the diffraction grating is set so that it can be approximated to coordinates by a third-order polynomial. The sensor heads H1 and H2 irradiate the scale 10 with light from the light source unit and output signals based on the diffracted light that is reflected light.

More specifically, count-up is performed based on reception of the diffracted light obtained by irradiating the diffraction grating with light or its combined light (interference light) by the light receiving unit, so that a count value based on the diffracted light can be obtained. For example, a signal period of ½ of a grating interval can be obtained by a two-phase sinusoidal wave generated by making −1 and +1 order diffracted lights interfere with each other. Further, by using an optical system, it is possible to obtain a signal period of ¼ of the grating interval. A count value having higher resolution can be obtained by dividing this signal by an interpolation circuit.

Due to the pitch interval of the diffraction grating as described above, a relationship between a displacement amount X in the X-axis direction of the sensor head H1, H2 and a count value S based on the signals output from the sensor heads H1 and H2 in the displacement amount X can be expressed by a third-order polynomial ($S=-aX^3+bX^2+cX+d$). However, the relational expression is not limited to the third-order expression, and may be expressed by a first-order polynomial, a second-order polynomial, or a higher-order polynomial of fourth-order or higher depending on a diffraction grating pattern.

Further, the diffraction grating pattern of the present embodiment becomes sparse to dense as it goes from one end in the X-axis direction to the center and becomes dense to sparse as it goes from the center to another end. Also in an orthogonal Y-axis direction, similarly, a count value is approximated by a third-order polynomial, and a diffraction grating pattern becomes sparse to dense as it goes from one end to the center and becomes dense to sparse as it goes from the center to another end. In other words, it can be said that the scale 10 according to the present embodiment includes a strained grating.

<Detection System>

In the detection system according to the one embodiment including the detection device 2 described above, as shown in FIG. 4, a control unit 30 controls an actuator of the moving mechanism 20 to control movement of the pedestal 4 to which the sensor heads H1 and H2 are attached. As the actuator of the moving mechanism 20, an actuator such as a stepping motor is used so that the control unit 30 can perform precise movement control. Thereby, the control unit 30 can accurately grasp the displacement amount X on the scale 10 of the sensor heads H1 and H2 attached to the pedestal 4.

It is noted that the pedestal 4 to which the sensor heads H1 and H2 are attached or the scale 10 may be moved by the moving mechanism of the equipment in which the detection device 2 is installed, and in that case, the control unit 30 can obtain information on a displacement amount from a control device of the equipment.

The control unit 30 is electrically connected to the sensor heads H1 and H2. The sensor heads H1 and H2 output signals based on the diffracted light that is the light emitted from the light source units and reflected by the scale 10. When the control unit receives the signals from the sensor heads H1 and H2, the control unit 30 advances a counter and acquires a count value. Since the scale 10 has a strained grating pattern from sparse to dense and from dense to sparse, as will be described later, an absolute position of the sensor heads H1 and H2 with respect to the scale 10 can be detected using a difference between count values based on the signals from the sensor heads H1 and H2.

Next, a specific method for detecting an absolute position on the scale 10 using the count value based on the signals from the sensor heads H1 and H2 will be described. First, a method for detecting an absolute position when thermal deformation does not occur in the pedestal 4 to which the sensor heads H1 and H2 are attached and the scale 10 will be described. Then, a method for detecting an absolute position when the thermal deformation occurs will be described. In that case, the latter method will be described by dividing it into a method for detecting an absolute position when thermal deformation occurs after the sensor heads H1 and H2 are powered on or after a count is reset and a method capable of detecting an absolute position in any state including a case where thermal deformation occurs before the sensor heads are powered on or before the count is reset.

(Absolute Position Measurement when Thermal Deformation does not Occur)

Figure 5:
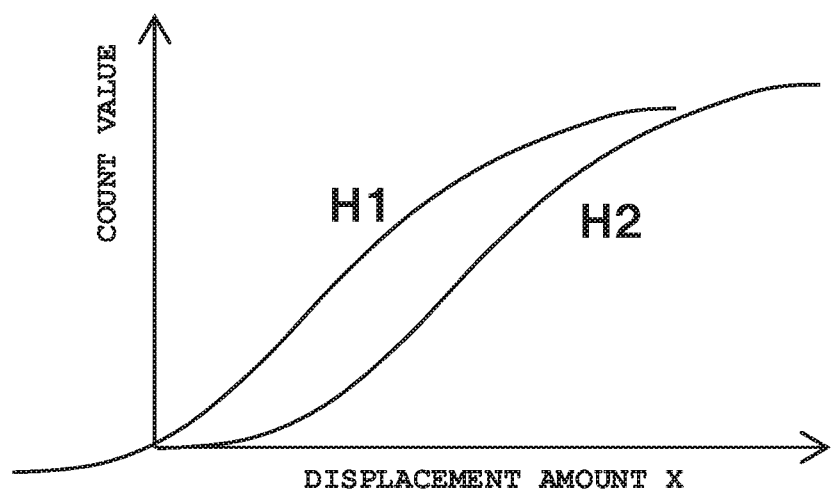
FIG. 5 is a graph showing a correlation between a displacement amount of two sensor heads of the detection device according to the one embodiment and a count value in the displacement amount.
Figure 6:
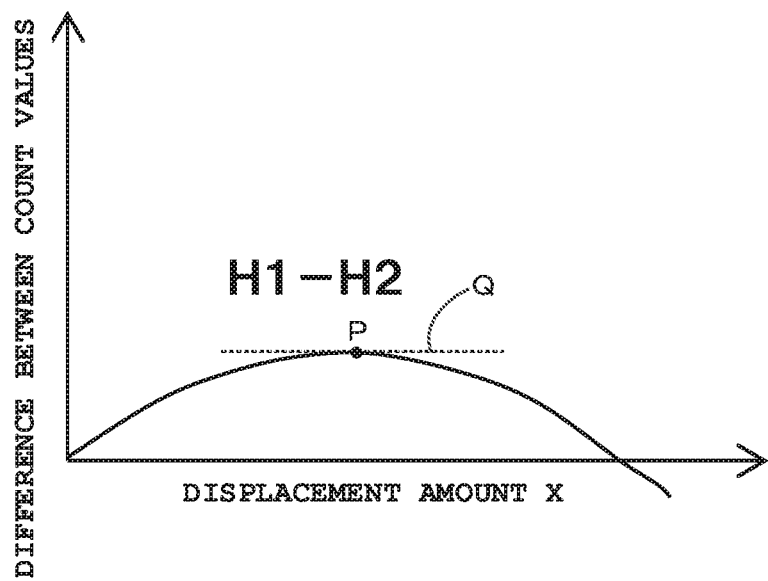
FIG. 6 is a graph showing a correlation between the displacement amount shown in FIG. 5 and a difference between count values of the two sensor heads in the displacement amount.

First, a method for detecting an absolute position on the scale 10 using a count value based on signals from the sensor heads H1 and H2 when thermal deformation does not occur will be described with reference to FIGS. 5 and 6. FIG. 5 is a graph showing a correlation between a displacement amount of the two sensor heads of the detection device according to the one embodiment and a count value in the displacement amount. FIG. 6 is a graph showing a correlation between the displacement amount shown in FIG. 5 and a difference between count values of the two sensor heads in the displacement amount.

As described above, a count value of the two sensor heads H1 and H2 in a displacement amount X can be represented by a third-order polynomial of the displacement amount X, and is represented by a cubic function curve as shown in FIG. 5. Further, a difference between count values of the two sensor heads H1 and H2 in the displacement amount X can be represented by a second-order polynomial of the displacement amount X, and is represented by a quadratic function curve as shown in FIG. 6.

As described above, since the diffraction grating pattern of the scale 10 becomes sparse to dense as it goes from the one end in the X-axis direction toward the center, the difference between the count values based on the signals from the sensor heads H1 and H2 and an absolute position of the diffraction grating pattern are in one-to-one correspondence. Therefore, the absolute position on the scale 10 in this region is determined by the difference between the count values based on the signals from the sensor heads H1 and H2. Similarly, since the diffraction grating pattern of the scale 10 becomes dense to sparse as it goes from the center toward the other end, the difference between the count values based on the signals from the sensor heads H1 and H2 and the absolute position of the diffraction grating pattern are in one-to-one correspondence. Therefore, the absolute position on the scale 10 in this region is determined by the difference between the count values based on the signals from the sensor heads H1 and H2.

The control unit 30 stores reference data of absolute positions on the scale 10 and differences between the count values of the sensor heads H1 and H2 corresponding to the absolute positions. Therefore, if it is possible to identify whether a region is from sparse to dense or from dense to sparse, by the difference between the count values based on the signals from the sensor heads H1 and H2, which are actually measured values, the absolute position on the scale 10 can be determined using the reference data.

However, when the diffraction grating pattern of the scale 10 has a symmetrical pattern with respect to the center, count values at symmetrical positions with respect to the center or a difference between them becomes the same. Therefore, if it is not possible to identify whether the region is from sparse to dense or from dense to sparse, one absolute position on the scale 10 cannot be determined.

At this time, as shown in FIG. 6, a position of a maximum point (a point where a tangent line Q is a horizontal line) in the graph of the difference between the count values of the sensor heads H1 and H2 represented by a quadratic polynomial is determined. This maximum point P is a center point of the scale 10 where a grating pitch is the densest. Therefore, the absolute position can be determined by the displacement amount and the difference between the count values at a measurement point with reference to a displacement amount and a difference between the count values at the maximum point P.

Thereby, the absolute position can be detected only by using the two heads, so that the small detection device 2 can be provided.

Further, the detection device 2 can be used as an incremental scale displaced in a plus direction and a minus direction using this maximum point P as an origin. As a result, it is possible to provide the small incremental detection device 2 using the two heads.

If the displacement amount and the difference between the count values can be measured at at least three points, a graph represented by a second-order polynomial as shown in FIG. 6 can be determined. Therefore, it is possible to determine an absolute position of a measurement point by determining a position of a center point where a grating pitch on the scale 10 is the densest, which is the maximum point. Similarly, the detection device 2 can be used as an incremental scale using this maximum point as an origin.

Detection of an absolute position in the Y-axis direction on the scale 10 is similar to the detection of the absolute position in the X-axis direction described above.

(Detection of Thermal Deformation)

Next, a case where the pedestal 4 to which the sensor heads H1 and H2 are attached is thermally deformed will be described. Here, a case of thermal expansion will be described as an example of the thermal deformation.

<Case where Thermal Deformation Occurs after Power is Turned on/Count is Reset>

Figure 7:
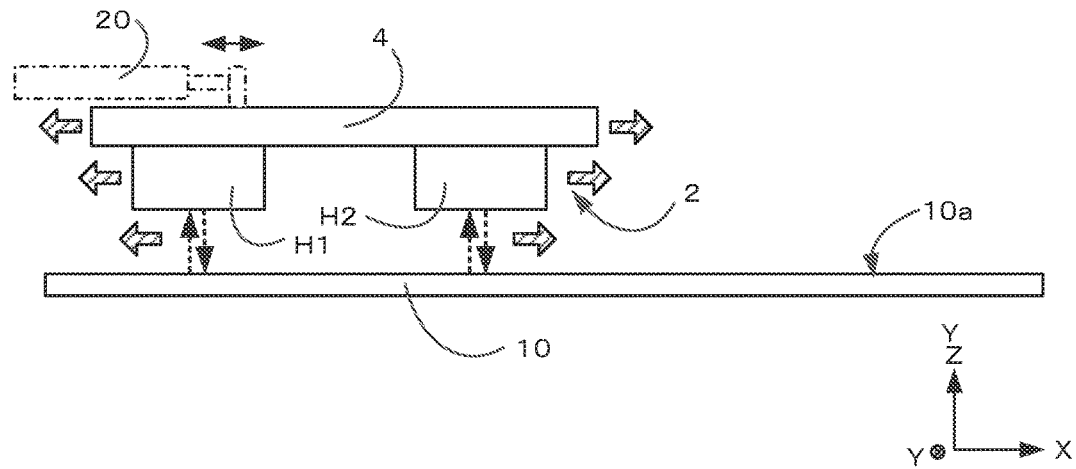
FIG. 7 is a side view schematically showing a case where thermal expansion occurs in a pedestal in the detection device according to the one embodiment of the present invention.
Figure 8:
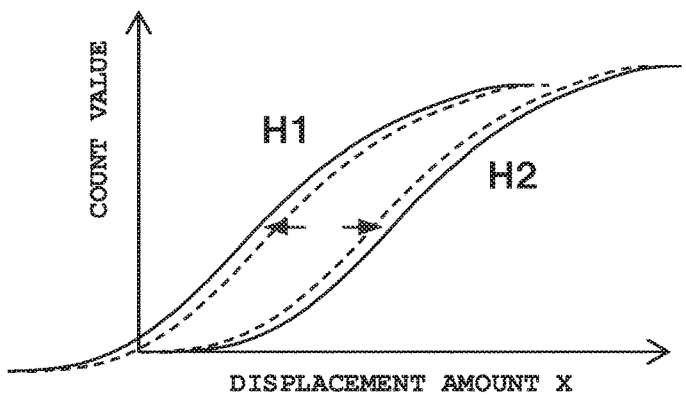
FIG. 8 is a graph showing a correlation between a displacement amount of the two sensor heads of the detection device according to the one embodiment and a count value in the displacement amount when the thermal expansion occurs in the pedestal.
Figure 9:
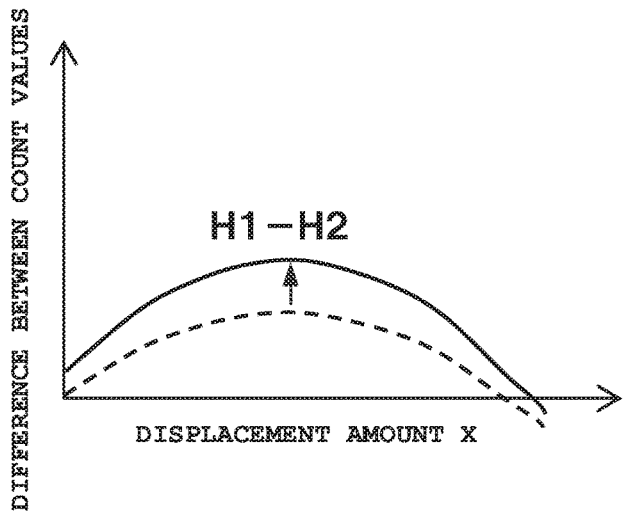
FIG. 9 is a graph showing a correlation between the displacement amount shown in FIG. 8 and a difference between count values of the two sensor heads in the displacement amount.

First, a case where the pedestal 4 to which the sensor heads H1 and H2 are attached is thermally deformed after the sensor heads H1 and H2 are powered on or after the count is reset will be described with reference to FIGS. 7 to 9. FIG. 7 is a side view schematically showing a case where thermal expansion occurs in the pedestal in the detection device according to the one embodiment of the present invention. FIG. 8 is a graph showing a correlation between a displacement amount of the two sensor heads of the detection device according to the one embodiment and a count value in the displacement amount when the thermal expansion occurs in the pedestal. FIG. 9 is a graph showing a correlation between the displacement amount shown in FIG. 8 and a difference between count values of the two sensor heads in the displacement amount. Graphs shown by dotted lines in FIGS. 8 and 9 show a case where the pedestal 4 does not thermally expand (the same case as that in FIGS. 5 and 6), and graphs shown by solid lines show a case where the pedestal 4 thermally expands.

As shown by hatched arrows in FIG. 7, a distance between the light receiving unit of the sensor head H1 and the light receiving unit of the sensor head H2 is increased by thermal expansion of the pedestal 4 to which the sensor heads H1 and H2 are attached. Considering an intermediate position of the sensor head H1 and the sensor head H2 as a reference, the sensor head H1 moves to an X-axis minus side more than a position when there is no thermal expansion, and the sensor head H2 moves to an X-axis plus side more than a position when there is no thermal expansion.

Therefore, as shown in FIG. 8, when the pedestal 4 thermally expands, a count value of the sensor head H1 increases and a count value of the sensor head H2 decreases at the same displacement amount X. As a result, as shown in FIG. 9, when the pedestal 4 thermally expands, a difference between the count value of the sensor head H1 and the count value of the sensor head H2 increases at the same displacement amount X.

It is noted that, on the contrary, when the pedestal 4 thermally contracts, the difference between the count value of the sensor head H1 and the count value of the sensor head H2 decreases at the same displacement amount X.

The control unit 30 can detect whether or not the pedestal 4 or the scale 10 is thermally deformed by comparing with the stored correlation between the displacement amount X in a reference state in which there is no thermal deformation and the difference between the count values in the displacement amount X.

The incremental scale position detection device cannot normally detect thermal expansion when thermal expansion exceeding half a wavelength (180-degree phase) has occurred in advance. However, in the present embodiment, by using the scale 10 provided with the strained grating and the two sensor heads H1 and H2 for detecting the position on the scale 10 based on the grating, thermal deformation of the pedestal 4 or the scale 10 can be detected based on the difference between the count values detected by the two sensor heads H1 and H2. Therefore, in the present embodiment, it is possible to provide the detection device that can accurately detect thermal deformation when the thermal deformation occurs after the sensor heads H1 and H2 are powered on or after the count is reset.

In particular, when the scale 10 has a grating pattern that becomes sparse to dense as it goes from one end to the center and becomes dense to sparse as it goes from the center to another end, thermal deformation can be accurately detected.

Further, when the pedestal 4 is made of metal and the scale 10 is made of glass, a difference in deformation due to heat is likely to occur, and thermal deformation can be easily and accurately detected. In this case, it can be considered that only the pedestal 4 is thermally deformed, as shown in FIG. 7. Therefore, the control unit 30 can determine that the pedestal 4 thermally expands if the count value at the same displacement amount X is higher than the reference data. On the contrary, if the count value at the same displacement amount X is lower than the reference data, the control unit 30 can determine that the pedestal 4 thermally contracts.

Figure 10:
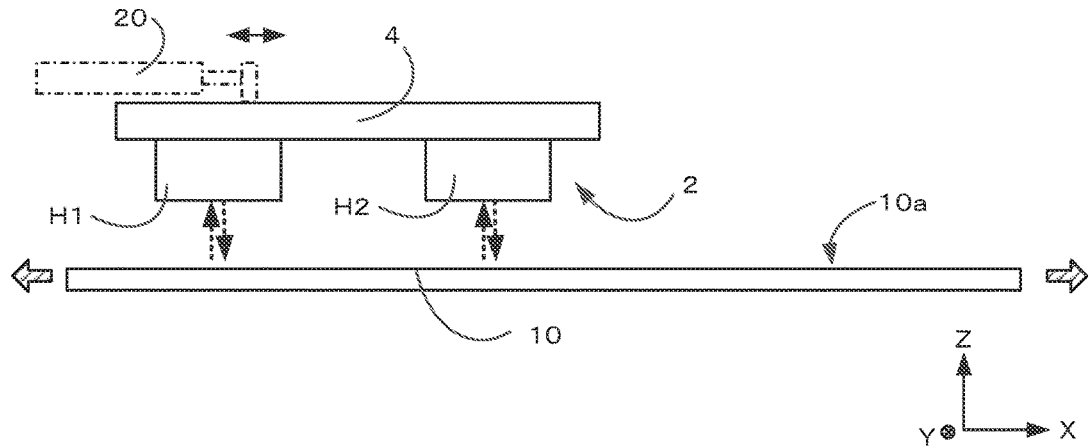
FIG. 10 is a side view schematically showing a case where thermal expansion occurs in a scale in the detection device according to the one embodiment of the present invention.

However, the present invention is not limited thereto, and conversely, the pedestal 4 may be made of glass and the scale 10 may be made of metal. In that case, the scale 10 thermally expands as shown by hatched arrows in FIG. 10. Also in this case, a difference in deformation due to heat is likely to occur, and thermal deformation can be detected easily and accurately.

Furthermore, any other material can be used for the pedestal 4 and the scale 10 as long as the material causes a difference in thermal deformation between the pedestal 4 and the scale 10. In this case, relative thermal deformation of the pedestal 4 and the scale 10 can be detected based on a difference between count values detected by the two sensor heads H1 and H2.

Further, as described above, when the sensor heads H1 and H2 are composed of optical sensors, accurate position detection using a diffraction grating can be realized. However, the present invention is not limited thereto, and a magnetic sensor head can be used as the sensor head. By using a scale corresponding to the magnetic sensor, it is possible to detect thermal deformation of the pedestal or the scale likewise.

<Case where Thermal Deformation Occurs Before Power is Turned on/Count is Reset>

When thermal deformation occurs before the power is turned on or before the count is reset, a difference between count values based on signals from the sensor heads H1 and H2 and an absolute position of a diffraction grating pattern are not in one-to-one correspondence, and there are cases where an absolute position on the scale 10 cannot be detected. Next, with reference to FIG. 11 and FIG. 12, a difference between count values when thermal deformation occurs before the sensor heads are powered on or before the count is reset will be described.

Figure 11:
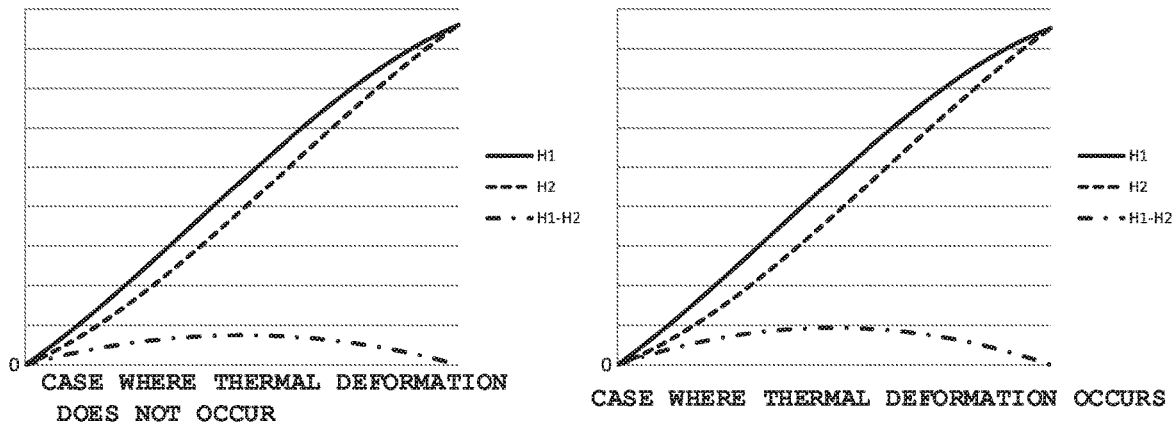
FIG. 11 is a graph showing a correlation between a displacement amount of the two sensor heads and a count value in the displacement amount, and a correlation between the displacement amount and a difference between count values of the two sensor heads in a case where power is turned on/a count is reset when the heads are located at an end of the scale, in which a graph in a case where thermal deformation does not occur is shown on the left, and a graph in a case where the thermal deformation occurs is shown on the right.
Figure 12:
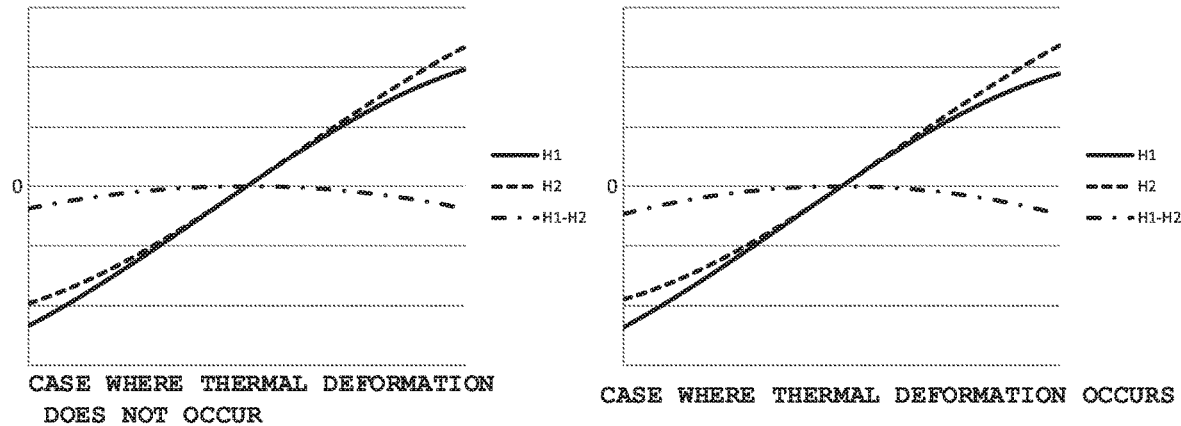
FIG. 12 is a graph showing a correlation between a displacement amount of the two sensor heads and a count value in the displacement amount, and a correlation between the displacement amount and a difference between count values of the two sensor heads in a case where the power is turned on/the count is reset when the heads are located at a center of the scale, in which a graph in a case where thermal deformation does not occur is shown on the left, and a graph in a case where the thermal deformation occurs is shown on the right.

FIG. 11 is a graph which shows a correlation between a displacement amount of the two sensor heads and a count value in the displacement amount and a correlation between the displacement amount and a difference between count values of the two sensor heads in a case where the power is turned on/the count is reset when the heads are located at an end of the scale. A graph in a case where thermal deformation does not occur is shown on the left, and a graph in a case where thermal deformation occurs is shown on the right. FIG. 12 is a graph which shows a correlation between a displacement amount of the two sensor heads and a count value in the displacement amount and a correlation between the displacement amount and a difference between count values of the two sensor heads in a case where the power is turned on/the count is reset when the heads are located at a center of the scale. A graph in a case where thermal deformation does not occur is shown on the left, and a graph in a case where thermal deformation occurs is shown on the right.

When the thermal deformation occurs before the power is turned on or before the count is reset, in a case of a difference between the count values when the same head moves by a known distance L, the difference and the position are in one-to-one correspondence. However, in a case of a difference between the count values of the two heads, they are changed depending on the positions when the power is turned on/the count is reset.

FIG. 11 shows a case where the power is turned on or the count is reset at an end position of the scale 10, the left graph shows a case where thermal deformation does not occur, and the right graph shows a case where thermal deformation occurs before the power is turned on/the count is reset. As is clear from FIG. 11, profiles of a difference H1-H2 that is the difference between the count values are different depending on the presence or absence of the thermal deformation.

FIG. 12 shows a case where the power is turned on or the count is reset at a center position of the scale 10, the left graph shows a case where thermal deformation does not occur, and the right graph shows a case where thermal deformation occurs before the power is turned on/the count is reset. Also in FIG. 12, profiles of a difference H1-H2 that is the difference between the count values are different depending on the presence or absence of the thermal deformation.

Therefore, when the thermal deformation occurs before the power is turned on/the count is reset, the absolute position on the scale 10 cannot be accurately detected by the above method described with reference to FIGS. 8 and 9.

(Analysis of Thermal Deformation)

The control unit 30 can accurately detect an absolute position on the scale 10 in any state including a case where thermal deformation occurs before the power is turned on/the count is reset based on the following analysis of thermal deformation.

When a count value in a displacement amount X by the diffraction grating of the scale 10 can be expressed by a third-order polynomial, the displacement amount X of the sensor heads H1 and H2 and a difference between count values in the displacement amount X can be expressed by a second-order polynomial. Therefore, the thermal deformation can be quantitatively detected based on a curvature ratio of a quadratic curve of the displacement amount X and a difference between count values during measurement and a quadratic curve of the displacement amount X and a difference between count values in a reference state where there is no thermal deformation. By calculating the curvature ratio of the quadratic curves during the measurement and in the reference state, a ratio of thermal deformation to the reference state can be calculated.

By properly correcting the difference between the count values during the measurement based on the ratio of thermal deformation to the reference state, an accurate absolute position can be detected even if the pedestal 4 or the scale 10 is thermally deformed regardless of before or after the sensor heads H1 and H2 are powered on/the count is reset. In this case, even if either the scale 10 or the pedestal 4 is thermally deformed or both are thermally deformed, an accurate absolute position can be detected by properly performing correction based on the ratio of thermal deformation.

The count value in the displacement amount X by the diffraction grating of the scale 10 can be expressed by a fourth-order polynomial or higher or another function, and in that case also, thermal deformation can be quantitatively detected, and a measured value can be corrected.

As described above, in the detection device 2 according to the present embodiment, the difference between the count values is represented as a predetermined function with respect to the displacement amount, and the thermal deformation of the pedestal 4 or the scale 10 can be detected based on the change in the curvature of the predetermined function. Since the detection is based on the change in the curvature of the function, the control unit 30 can detect the thermal deformation quickly and accurately regardless of before or after the sensor heads H1 and H2 are powered on/the count is reset.

In particular, based on the ratio of the curvature of the predetermined function during the measurement and the curvature of the predetermined function in the reference state, a ratio of relative thermal deformation of the pedestal 4 and the scale 10 to the reference state is calculated, and a measured value can be accurately corrected. Therefore, it is possible to provide the detection device 2 that can accurately detect the thermal deformation and correct the measured value in any state including a state before the sensor heads H1 and H2 are powered on/before the count is reset.

For example, it can be considered that thermal deformation occurs in either the pedestal 4 or the scale 10 when either one is made of glass. In that case, since a coefficient of thermal expansion of a member that undergoes thermal deformation is known, temperature of an environment in which the detection device 2 is installed can be estimated based on the ratio of thermal deformation to the reference state determined as described above.

The control unit 30 can also issue an alarm when the ratio of thermal deformation of the pedestal 4 and the scale 10 to the reference state exceeds a predetermined threshold value. As a result, it is possible to appropriately perform monitoring control regarding a temperature environment without using a temperature sensor or the like.

As described above, the detection device 2 can function as an absolute scale for detecting an absolute position on the scale 10 in any state including a state before the sensor heads H1 and H2 are powered on/before the count is reset.

Further, in a graph showing a correlation of a difference with respect to a displacement amount of the sensor heads, the detection device 2 can function as an incremental scale by determining a position where a grating pitch on the scale 10 is the densest, which is a maximum point in the graph, and using this maximum point as a origin. Also in this case, it is possible to provide an incremental scale capable of accurately detecting thermal deformation and detecting an accurate position in any state including a state before the sensor heads are powered on/before the count is reset. Further, depending on a grating pattern of the scale 10, in the graph showing the correlation of the difference with respect to the displacement amount of the sensor heads, the detection device 2 can function as an incremental scale by determining a position where the grating pitch on the scale 10 is the sparsest, which is a minimum point in the graph, and using this minimum point as the origin.

Although the embodiment and aspects of the present invention have been described, the disclosure may be changed in details of the configuration, and combinations of elements, changes in order, etc. in the embodiment and aspects can be realized without departing from the scope and idea of the claimed present invention.

REFERENCE SIGNS LIST 2 detection device
4 pedestal
10 scale
10a detection surface
20 moving mechanism
30 control unit
H1, H2 sensor head
P maximum point
Q tangent line

What is claimed is:

1. A detection device comprising:
a scale with a strained grating that has a grating pattern that, in a first direction, becomes sparse to dense as going from one end to a center in the first direction and becomes dense to sparse as going from the center to another end in the first direction and, in a second direction, becomes sparse to dense as going from one end to a center in the second direction and becomes dense to sparse as going from the center to another end in the second direction; and
two sensor heads mounted on a pedestal at a predetermined distance, the sensor heads detecting positions on the scale based on the grating,
wherein thermal deformation of the pedestal or the scale is detected based on a change in a difference between the positions detected by the two sensor heads.

2. The detection device according to claim 1, wherein the difference is represented as a predetermined function with respect to a displacement amount, and the thermal deformation of the pedestal or the scale is detected based on a change in curvature of the predetermined function.

3. The detection device according to claim 2, wherein the thermal deformation of the pedestal or the scale is corrected based on a ratio of the curvature of the predetermined function during measurement and the curvature of the predetermined function in a reference state.

4. The detection device according to claim 1, wherein the first and second directions are X-axis and Y-axis directions of the scale.

5. The detection device according to claim 1, wherein the sensor heads include optical sensors.

6. The detection device according to claim 5, wherein the pedestal is made of metal and the scale is made of glass.

7. The detection device according to claim 1, wherein the detection device is configured as an absolute scale for detecting an absolute position on the scale.

8. The detection device according to claim 1, wherein the detection device is configured as an incremental scale for, determining a position where a grating pitch of the scale is densest or sparsest, which is a maximum point or a minimum point in a graph showing a correlation of the difference with respect to the displacement amount of the sensor heads, and by using the position as an origin.

* * * * *